United States Patent
Smith

(10) Patent No.: US 7,007,142 B2
(45) Date of Patent: Feb. 28, 2006

(54) NETWORK DATA STORAGE-RELATED OPERATIONS

(75) Inventor: Hubbert Smith, Sandy, UT (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 10/080,063

(22) Filed: Feb. 19, 2002

(65) Prior Publication Data

US 2003/0158998 A1  Aug. 21, 2003

(51) Int. Cl.
*G06F 12/16* (2006.01)
*G06F 13/12* (2006.01)

(52) U.S. Cl. .................. 711/162; 709/214; 710/74

(58) Field of Classification Search ............... 711/112, 711/162, 144, 167, 114; 710/5, 29, 62, 74; 714/10, 6; 709/214

See application file for complete search history.

(56) References Cited

U.S. PATENT DOCUMENTS

| | | | | |
|---|---|---|---|---|
| 5,157,663 | A | * | 10/1992 | Major et al. .................. 714/10 |
| 5,901,327 | A | * | 5/1999 | Ofek ............................. 710/5 |
| 6,209,002 | B1 | | 3/2001 | Gagne et al. ............... 707/204 |
| 6,629,213 | B1 | * | 9/2003 | Sharma ....................... 711/144 |
| 2001/0037371 | A1 | * | 11/2001 | Ohran ........................ 709/214 |

FOREIGN PATENT DOCUMENTS

EP  1150210 A2  10/2001

OTHER PUBLICATIONS

Microsoft, Microsoft Computer Dictionary, 2002, Microsoft Press, Fifth Edition, p. 256.*
M. Bakke et al., IPS Internet Draft, draft-ietf-ips-iscsi-name-disc-03.txt. iSCSI Naming and Discovery.
M. Bakke et al., Internet Draft, draft-bakke-iscsi-iscsimib-02.txt, Feb. 2000.
B. Aboba et al., PS Working Group, draft-ietf-ips-security-06, Nov. 20, 2001.
S. Bailey et al., Transport Area Working Group, draft-ietf-svwg-tcp-ulp-frame-01, Nov. 15, 2001.
J. Wendt et al., Internet Draft, draft-wendt-direct-access-reqs-00, Nov. 13, 2001.
S. Bailey et al., Internet Draft, draft-garcia-direct-access-problem-00, Nov. 13, 2001.
K. Gibbons et al., Internet Draft, draft-ietf-ips-isns-06, Nov. 2001.
PCI Local Bus, PCI Local Bus Specification, Revision 2.2, Dec. 18, 1998.

(Continued)

*Primary Examiner*—Gary Portka
(74) *Attorney, Agent, or Firm*—Blakely, Sokoloff, Taylor & Zafman LLP

(57) ABSTRACT

A network in which one embodiment of the present invention may be practiced may include first and second network nodes coupled together via a network communications link, and first and second sets of mass storage devices associated with the first and second network nodes, respectively. The first and second network nodes may comprise first and second input/output (I/O) processors, respectively. The first I/O processor may cause, in response to a first request, both the execution of a first data storage-related operation associated with the first set of mass storage devices and the issuance of a second request from the first network node to the second network node via the link to cause the second I/O processor to perform, in response to the second request, a second data storage-related operation associated with the second set of mass storage devices.

10 Claims, 9 Drawing Sheets

OTHER PUBLICATIONS

PCI Local Bus, PCI-X Addendum to the PCI Local Bus Specification, Revision 1.0a, Jul. 24, 2000.
PCI Local Bus, PCI Local Bus Specification, Revision 2.3, Mar. 29, 2002.
PCI Local Bus, Appendix D, Revision 2.2, Class Codes.
PCI Local Bus, Appendix H, Capability IDs, 0003.13.
Serial ATA: High Speed Serialized AT Attachment, Revision 1.0, Aug. 29, 2001.
Internet Protocol DARPA Internet Program Protocol Specification, Sep. 1981.
J. Satran et al., IPS Internet Draft, draft-ietf-ips-iscsi-03.txt, Jan. 10, 2000.
J. Satran et al., IPS Internet Draft, draft-ietf-iscsi-01.txt, Nov. 2000.
J. Satran et al., IPS Internet Draft, draft-ietf-ips-iscsi-00.txt, Nov. 2000.
J. Satran et al., IPS Internet Draft, draft-ietf-ips-iscsi-02.txt, Nov. 2000.
J. Satran et al., IPS Internet Draft, draft-ietf-ips-iscsi-04.txt, Feb. 23, 2001.
J. Satran et al., IPS Internet Draft, draft-ietf-ips-iscsi-05.txt, Mar. 1, 2001.
J. Satran et al., IPS Internet Draft, draft-ietf-ips-iscsi-06.txt, Apr. 19, 2001.
J. Satran et al., IPS Internet Draft, draft-ietf-ips-iscsi-07.txt, Jul. 20, 2001.
J. Satran et al., IPS Internet Draft, draft-ietf-ips-iscsi-08.txt, Sep. 30, 2001.
J. Satran et al., IPS Internet Draft, draft-ietf-ips-iscsi-09.txt, Nov. 19, 2001.
J. Satran et al., IPS Internet Draft, draft-ietf-ips-iscsi-10.txt, Jan. 20, 2002.
IBM Technical Disclosure Bulletin, Jun. 1993, vol. 36, No. 06A, pp. 161-162.

* cited by examiner

NETWORK DATA STORAGE-RELATED OPERATIONS

BACKGROUND

In one type of conventional computer network, one or more server computer nodes or "servers" are provided that may be associated with (i.e., exchange data with and control) one or more arrays of disk mass storage devices in which user data generated by processes executing in the network may be stored, and from which such data may be retrieved by such processes. At least one of these arrays may be a redundant array of independent disks (hereinafter, "redundant array") in which a copy (or "mirror") of a primary data volume stored in a primary array of disk mass storage devices (hereinafter "primary array") may be replicated, and from which the replicated data volume (hereinafter "the redundant data volume") may be recovered, in the event of a failure of the primary array. Hereinafter, a redundant array is said to be "associated with" a primary array, if the redundant array stores a redundant data volume that is a copy of a primary data volume in the primary array. Also hereinafter, a redundant data volume is said to be associated with a primary data volume if the redundant data volume is a mirror of the primary data volume.

In this conventional network, a server (hereinafter termed an "originating" server) that is associated with a primary array may be coupled via a network communication link to another server (hereinafter termed a "target" server) that is associated with a redundant array, and the redundant array may be associated with the primary array. The originating server and the target server may each comprise a respective network interface card (NIC), host bus adapter (HBA), central processing unit (CPU), and system memory. In each of the originating and target servers, the respective CPU and respective system memory are interconnected by a respective system bus, the respective NIC and respective HBA are interconnected by a respective input/output (I/O) bus and I/O controller system. The NIC in the originating server is coupled to the NIC in the target server by the communication link, the HBA in the originating server is coupled to and controls the primary array, and the HBA in the target server is coupled to and controls the redundant array. Respective program processes reside in the servers' respective system memories that control the servers' respective CPUs so as cause the servers to carry out conventional synchronous data replication operations. The respective program processes residing in the respective system memories include respective operating system, RAID driver, replication driver, and network driver/communication stack processes. Application-level database processes also reside in the originating server's system memory.

A human user of the originating server may issue a request, via a user interface to an application-level program process residing in the originating server, to store user data in a primary data volume in the primary array. In response to this request, the process generates a data write request to one or more O/S processes in the originating server that causes the originating server's CPU to transmit the user data via the originating server's system bus to, and store the data in, the originating server's system memory. Thereafter, these O/S processes issue a request to originating server's RAID driver that causes the originating server's CPU to retrieve the data from the originating server's system via the originating server's system bus, to fragment the data into one or more data blocks (e.g., Small Computer Systems Interface (SCSI) protocol data blocks), to transmit the data blocks to, and store them in, the originating server's system memory, and to cause the originating server's I/O bus controller to retrieve the blocks from the originating server's system memory via the originating server's system bus and to forward the blocks to the originating server's HBA. The originating server's HBA then writes the data blocks in the primary data volume, and when the data blocks have been successfully written in the primary data volume, the originating server's HBA returns to the originating server's CPU via the originating server's I/O bus and controller system, and system bus a "write complete" message to indicate same.

Also in response to the request from application-level process, the originating server's O/S processes request that the originating server's replication driver processes command the originating server's CPU to generate a copy of the user data, and to fragment the copy of the user data into one or more replication data packets, and to store the packets in the originating server's system memory. After these packets have been stored in the originating server's system memory, the originating server's network driver processes cause the originating server's CPU to retrieve the packets from the originating server's system memory via the originating server's system bus, to encapsulate the packets with header and other information so as to form one or more Ethernet frames, to forward the frames to the originating server's NIC via the originating server's system bus, I/O bus and controller system, and to cause the originating server's NIC to forward the frames to the target server's NIC via the Ethernet link.

The target server's NIC receives the frames, and in response to the received frames, the target server's operating system, RAID driver, replication driver, and network driver/communication stack processes cause the target server's CPU to perform operations that de-encapsulate the data packets from the frames, reconstruct the user data from the data packets, fragment the reconstructed user data into one or more data blocks, and store the blocks in the redundant data volume. After all of the user data has been successfully written in the redundant volume, the target server's O/S, replication driver, and network driver processes cause the target server's CPU to perform operations that generate and forward to the originating server (i.e., via the target server's NIC and the communication link) a data replication success message frame indicating successful replication of the data in the redundant array. As can be appreciated, the above operations carried out by the target server's CPU involve a substantial number of transactions/interactions among, inter alia, the target server's CPU, system memory, and system bus.

An excessively large number of CPU, system memory, and system bus transactions and operations must be performed in the originating and target servers to carry out the above data storage-related operations in this conventional network. Unfortunately, this causes excessive amounts of originating and target server CPU, system memory, and system bus processing resources to be consumed to carry out such operations.

BRIEF DESCRIPTION OF THE DRAWINGS

Features and advantages of embodiments of the present invention will become apparent as the following Detailed Description proceeds, and upon reference to the Drawings, wherein like numerals depict like parts, and in which.

It should be understood that although the following Detailed Description will proceed with reference being made to illustrative embodiments of the present invention, many alternatives, modifications, and variations thereof will be apparent to those skilled in the art. Accordingly, it is intended that the present invention be viewed broadly, and be defined only as set forth in the accompanying claims.

DETAILED DESCRIPTION

Figure 1:
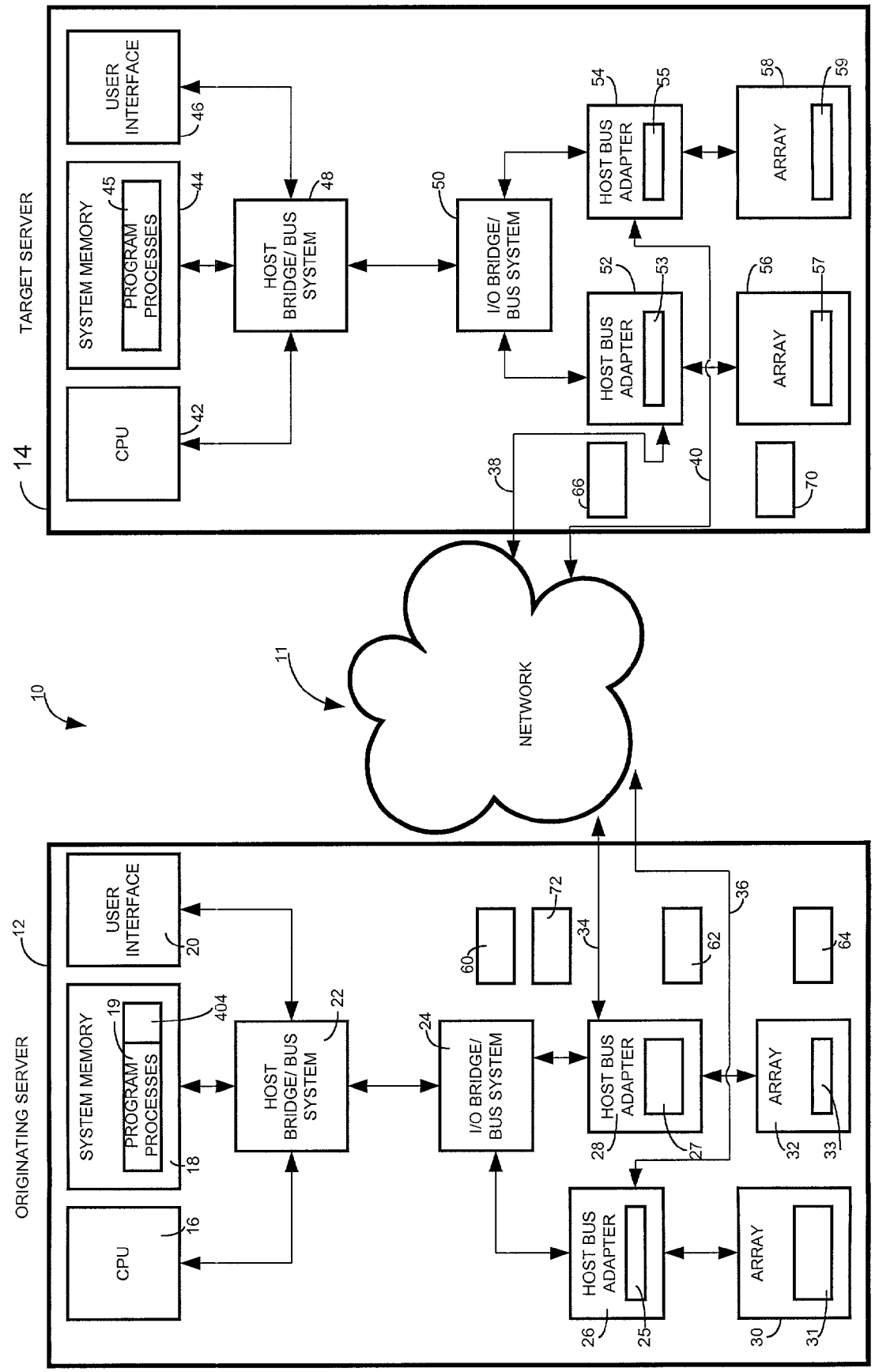
FIG. 1 is a diagram illustrating components of a data storage network in which an embodiment of the present invention may be practiced to advantage.
Figure 2:
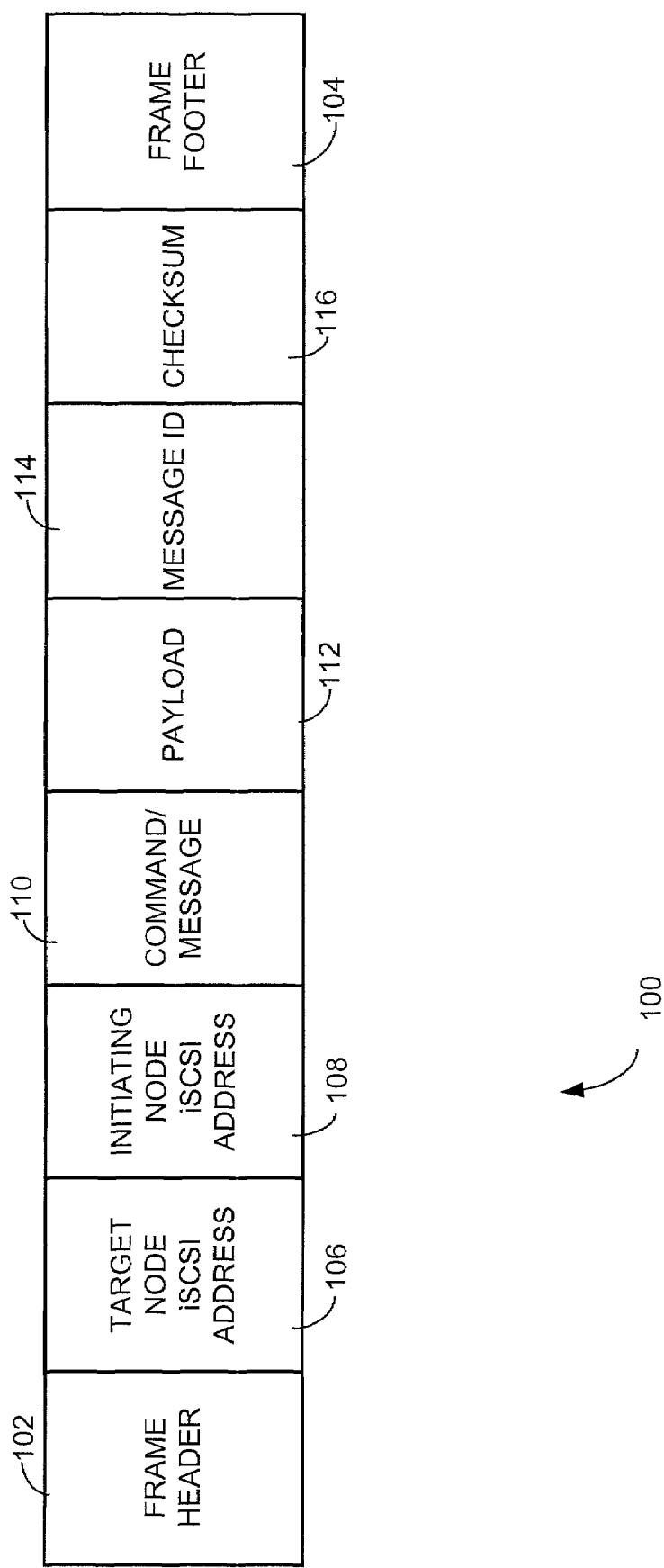
FIG. 2 is a diagram illustrating fields comprised in a command/message frame that may be forwarded between an originating and a target server in the network of FIG. 1.
Figure 3:
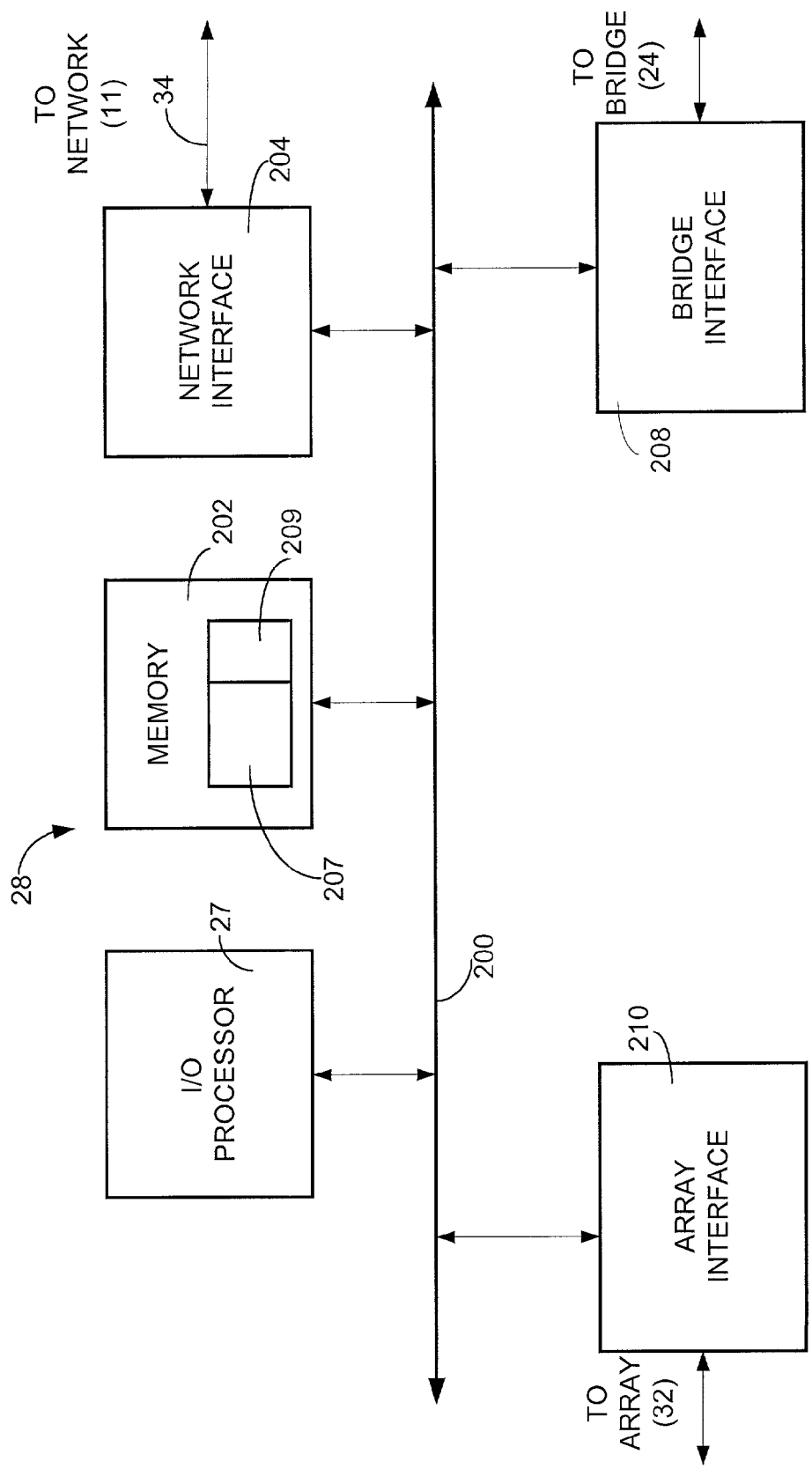
FIG. 3 is a diagram illustrating components of a HBA comprised in an originating server in the network of FIG. 1.
Figure 4:
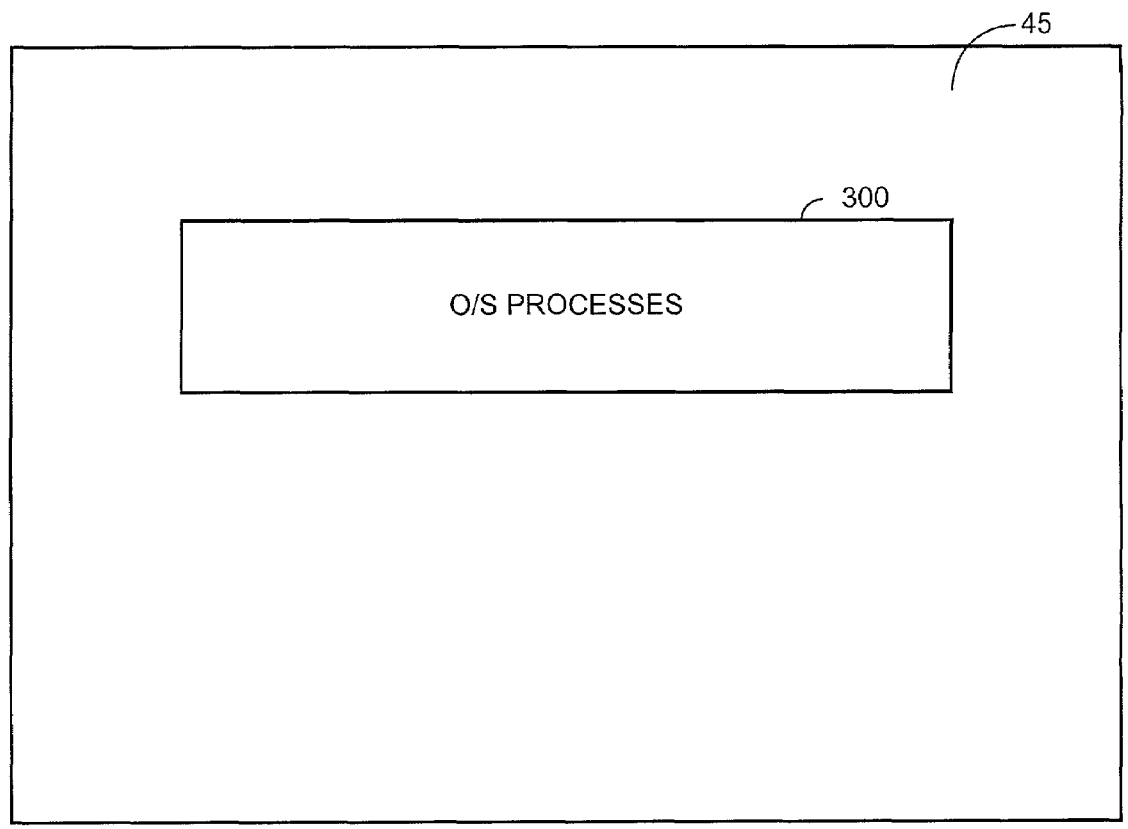
FIG. 4 is a diagram illustrating program processes that may reside in system memory in an originating server in the network of FIG. 1.

With reference being made to FIGS. 1 to 9, illustrative embodiments of the present invention will now be described. FIG. 1 is a highly schematic diagram illustrating a data storage network 10 wherein an embodiment of the present invention may be practiced to advantage. Network 10 may include an originating server node 12, a target server node 14, and a data communications network 11. The network 11 may comprise one or more local and/or wide area networks that may utilize one or more well-known network communication protocols (e.g., Ethernet and/or Transmission Control Protocol/Internet Protocol (TCP/IP)-based protocols). The originating server 12 may be coupled to network 11 via network links 34 and 36, and target server 14 may be coupled to the network 11 via network links 38 and 40, in such a way as to permit the servers 12 and 14 to communicate among each other via the network 11. The originating server 12 and the target server 14 may be geographically remote from each other.

Originating server 12 includes CPU 16, system memory 18, user interface 20, host bridge/bus system 22, I/O bridge/bus system 24, HBA 26, HBA 28, and two arrays or sets of disk mass storage devices 30 and 32, respectively. Each of the arrays or sets of disk devices 30 and 32 may comprise one or more (or, as is the case in this embodiment of the present invention, a plurality of) respective disk mass storage devices (e.g., optical or magnetic disk mass storage devices). Alternatively, if the server 12 is appropriately modified in ways apparent to those skilled in the art, each of the arrays 30 and 32 instead may comprise respective solid-state mass storage devices.

HBA 28 may be electrically coupled to, and may be configured to exchange data and commands with the array 32, via a respective Serial Advanced Technology Attachment (S-ATA)-based interface 210 (see FIG. 3); by issuing appropriate commands to the array 32 via the interface 210, the HBA 28 may cause data referenced or comprised in the commands to be stored in or retrieved from the array 32. HBA 28 may also include an I/O processor 27, HBA memory 202, network interface 204 and I/O bridge/bus system interface 208. In HBA 28, the processor 27, memory 202, and interfaces 204, 208 and 210 may be interconnected by, and exchange data and commands among each other using, a Peripheral Component Interconnect (e.g., of a type that is described in or compatible with the PCI Local Bus Specification Rev. 2.2, published by PCI Special Interest Group of 5440 S.W. Westgate Drive, #217, Portland, Oreg. 97221, United States of America, and hereinafter termed "PCI") or PCI-extended (e.g., of a type that is described in or compatible with the PCI-X Specification Rev. 1.0a, published by and available from the PCI Special Interest Group, hereinafter termed "PCI-X") bus system 200. Of course, bus system 200 may instead comprise other types of bus systems without departing from this embodiment of the present invention. Processor 27 may include integrated circuit chips comprised in an integrated circuit chipset commercially available from the owner of the subject application (e.g., Intel® 80310 Chipset that includes the Intel® 80200 processor and the Intel® 80312 companion chip), although alternatively, I/O processor 27 instead may comprise other integrated circuit chips (e.g., the Intel® 80960 RM/RN I/O processor or the Intel® 80321 processor), or other types of processors/integrated circuits without departing from this embodiment of the present invention. Network interface 204 may be coupled to the link 34, may be configured to facilitate/carry out the physical operations that permit the HBA 28 and server 12 to communicate with node 14) in the network system 10. The bridge interface 208 is coupled to the I/O bridge/bus system 24 and is configured to permit the HBA 28 to be able to exchange data and commands with the system 24. Memory 202 may comprise random access memory (RAM) that may be used to store (and in which may reside) program processes 207, high speed cache memory that may be used to store data that is intended to be stored in, or that has been recently retrieved from the array 32, and non-volatile electrically erasable programmable memory (EEPROM) that may be used to store data stored in the cache memory in the event that an outage of external actuating power to the HBA occurs. Although not shown in the Figures, HBA 28 may include a system to sense when such an outage has occurred and to trigger the processor 27 to cause the memory 202 to store into the EEPROM the data stored in the cache memory; an emergency battery power back-up system (not shown) may be included in the HBA 28 to power the HBA 28 during these operations. The processor 27 may be programmed to retrieve into the cache memory, upon a subsequent power-up of the HBA 28, the data stored in the EEPROM. Additional details concerning the construction and operation of the HBA 28 are presented below.

Although not shown in the Figures, it should be understood that the respective construction of the HBA 26 may be substantially identical to the respective construction of the HBA 28. Thus, in order to avoid unnecessary duplication of description, the construction of the HBA 26 will not be presented in detail herein. However, suffice it state that the HBA 26 may be electrically coupled to, and may be configured to exchange data and commands with the array 30, via a respective S-ATA-based interface (not shown) comprised in the HBA 26; by issuing appropriate commands to the array 30 via this ATA-based interface, the HBA 26 may cause data referenced or comprised in such commands to be stored in or retrieved from the array 30. HBA 26 may comprise a respective I/O processor 25 that may have a respective construction that is substantially similar to that of I/O processor 27. HBA 26 also may comprise a respective network interface (not shown) that may have a respective construction that is substantially similar to that of interface 204 and may be coupled via the link 36 to network 11.

The I/O bridge/bus system 24 and host bridge/bus systems 22 may comprise an I/O controller hub system and a memory controller hub system, respectively, that may be constructed using integrated circuit chips comprised in an integrated circuit chipset commercially available from the owner of the subject application (e.g., the Intel® 860 Chipset). The CPU 16, system memory 18, and user interface 20 may be electrically coupled, via the host bridge/bus system 22, to each other and to the I/O bridge/bus system 24. The system 22 is configured to permit/facilitate exchange of data and commands among the CPU 16, memory 18, user interface 20, and system 24. Additionally, the system 24 is configured to permit/facilitate exchange of data and commands among the system 22 and the adapters 26 and 28.

Memory 18 may comprise RAM that may be used to store (and in which may reside) program processes 19. The RAM in memory 18 also may store user data that is intended to be stored in, or that has been retrieved from, the arrays 30 and 32. The CPU 16 may comprise an Intel® Xeon™ processor of the type that is commercially available from the owner of the subject application, although CPU 16 may comprise other types of processors without departing from the present invention.

Target server 14 includes CPU 42, system memory 44, user interface 46, host bridge/bus system 48, I/O bridge/bus system 50, HBA 52, HBA 54, and two arrays or sets of disk mass storage devices 56 and 58, respectively. Each of the arrays or sets of disk devices 56 and 58 may comprise one or more (or, as is the case in this embodiment of the present invention, a plurality of) respective disk mass storage devices (e.g., optical or magnetic disk mass storage devices). Alternatively, if the server 14 is appropriately modified in ways apparent to those skilled in the art, each of the arrays 56 and 58 instead may comprise respective solid-state mass storage devices.

HBA 52 may be electrically coupled to, and may be configured to exchange data and commands with the array 56, via a respective conventional S-ATA-based interface 510 (see FIG. 6); by issuing appropriate commands to the array 56 via the interface 510, the HBA 52 may cause data referenced or comprised in the commands to be stored in or retrieved from the array 56. HBA 52 may also include an I/O processor 53, HBA memory 502, network interface 504 and I/O bridge/bus system interface 508. In HBA 52, the processor 53, memory 502, and interfaces 504, 508 and 510 may be interconnected by, and exchange data and commands among each other using, a PCI or PCI-X bus system 500. Processor 53 may include integrated circuit chips comprised in an integrated circuit chipset commercially available from the owner of the subject application (e.g., the Intel® 80310 Chipset), although alternatively, I/O processor 53 instead may comprise other integrated circuit chips (e.g., the Intel® 80960 RM/RN I/O processor or the Intel® 80321 processor), or other types of processors/integrated circuits without departing from this embodiment of the present invention. Network interface 504 may be coupled to the link 38, may be configured to facilitate/carry out the physical operations that permit the HBA 52 and server 14 to communicate with node 12 in the network system 10. The bridge interface 508 is coupled to the I/O bridge/bus system 50 and is configured to permit the HBA 52 to be able to exchange data and commands with the system 48. Memory 502 may comprise RAM that may be used to store (and in which may reside) program processes 507, high speed cache memory that may be used to store user data that is intended to be stored in, or that has been recently retrieved from the array 56, and non-volatile EEPROM that may be used to store data stored in the cache memory in the event that an outage of external actuating power to the HBA 52 occurs. Although not shown in the Figures, HBA 52 may include a system to sense when such an outage has occurred and to trigger the processor 53 to cause the memory 502 to store into the EEPROM the data stored in the cache memory; an emergency battery power back-up system (not shown) may be included in the HBA 52 to power the HBA 52 during these operations. The processor 53 may be programmed to retrieve in the cache memory, upon subsequent power-up of the HBA 52, the data stored in the EEPROM. Additional details concerning the construction and operation of the HBA 52 are presented below.

Although not shown in the Figures, it should be understood that the respective construction of the HBA 54 may be substantially identical to the respective construction of the HBA 52. Thus, in order to avoid unnecessary duplication of description, the construction of the HBA 54 will not be presented in detail herein. However, suffice it state that the HBA 54 may be electrically coupled to, and may be configured to exchange data and commands with the array 58, via a respective conventional S-ATA-based interface (not shown) comprised in the HBA 54; by issuing appropriate commands to the array 58 via this ATA-based interface, the HBA 54 may cause data referenced or comprised in such commands to be stored in or retrieved from the array 58. HBA 54 may comprise a respective I/O processor 55 that may have a respective construction that is substantially similar to that of I/O processor 53. HBA 54 also may comprise a respective network interface (not shown) that may have a respective construction that is substantially similar to that of interface 504 and may be coupled via the link 38 to network 11.

The I/O bridge/bus system 50 and host bridge/bus systems 48 may comprise an I/O controller hub system and a memory controller hub system, respectively, that may be constructed using integrated circuit chips comprised in an integrated circuit chipset commercially available from the owner of the subject application (e.g., the Intel® 860 Chipset). The CPU 42, system memory 44, and user interface 46 may be electrically coupled, via the host bridge/bus system 48, to each other and to the I/O bridge/bus system 50. The system 48 is configured to permit/facilitate exchange of data and commands among the CPU 42, memory 44, user interface 46, and system 50. Additionally, the system 50 is configured to permit/facilitate exchange of data and commands among the system 48 and the adapters 52 and 54.

Memory 44 may comprise RAM that may be used to store (and in which may reside) program processes 45. The RAM in memory 44 also may store user data that is to be stored in, or that has been retrieved from, the arrays 56 and 58. The CPU 42 may comprise an Intel® Xeon™ processor, although CPU 42 may comprise other types of processors without departing from the present invention.

In server 12, the adapters 26 and 28 may each comprise respective circuit boards that may be electrically and mechanically coupled via respective electromechanical connectors (not shown) to a motherboard (not shown). The motherboard in server 12 may comprise CPU 16, memory 18, and systems 22 and 24. When the adapters 26 and 28 are so coupled to the motherboard in server 12, the adapters 26 and 28 may become coupled to the system 24 in the motherboard in server 12. Separate electro-mechanical connectors (not shown) may be provided in server 12 to couple the disk mass storage devices in the arrays 30 and 32 to the adapters 26 and 28, respectively.

In server 14, the adapters 52 and 54 may each comprise respective circuit boards that may be electrically and mechanically coupled via respective electromechanical connectors (not shown) to a motherboard (not shown). When the adapters 52 and 54 are so coupled to the motherboard in server 14, the adapters 52 and 54 may become coupled to the system 50 in the motherboard in server 14. Separate electromechanical connectors (not shown) may be provided in server 14 to couple the disk mass storage devices in the arrays 56 and 58 to the adapters 52 and 54, respectively.

Although in network 10, the adapters 26, 28, 52, and 54 may be coupled to and communicate with the disk arrays 30, 32, 56, and 58, respectively, via respective S-ATA-based interfaces and protocols, respectively, if the adapters 26, 28, 52, and 54 and disk arrays are appropriately modified, the adapters 26, 28, 52, and 58 instead may be coupled to and communicate with the disk arrays 30, 32, 56, and 58 via other types of interfaces and protocols (e.g., Fibre Channel (FC) or Small Computer Systems Interface (SCSI)-based interfaces and protocols), respectively, without departing from this embodiment of the present invention. Additionally, although not shown in the Figures, the disk arrays 30 and 32 may be enclosed in physical enclosures that are physically separate from the physical enclosure of the server 12. The disk arrays 56 and 58 may be enclosed in physical enclosures that are physically separate from the physical enclosure of the server 14. Further alternatively, if network 10 is appropriately modified, the server 12 may comprise only a single HBA, although the inclusion of multiple host bus adapters in server 12 may facilitate connections to additional target servers (e.g., in addition to target server 14) and may facilitate implementation of failover fault tolerance features in the network 10 that may help to eliminate a single point of failure in the network 10 in the event of failure of a single HBA in the server 12.

With reference now being made to FIGS. 1–9, the operation of network system 10 will be described. Although not shown in the Figures, each of the user interfaces 20 and 46 may comprise a respective conventional keyboard, pointing device (e.g., mouse or trackball device), terminal/display unit, basic input/output system (BIOS), etc. By using user interface 20, a human user (not shown) of server 12 may issue commands to, and receive output data from the CPU 16 and processes 19 residing in the system memory 18 that may permit the human user to control and monitor the operation of the server 12. Similarly, by using the user interface 46, a human user (not shown) of server 14 may issue commands to, and receive output data from the CPU 42 and processes 45 residing in the system memory 44 that may permit the human user to control and monitor the operation of the server 14.

Figure 5:
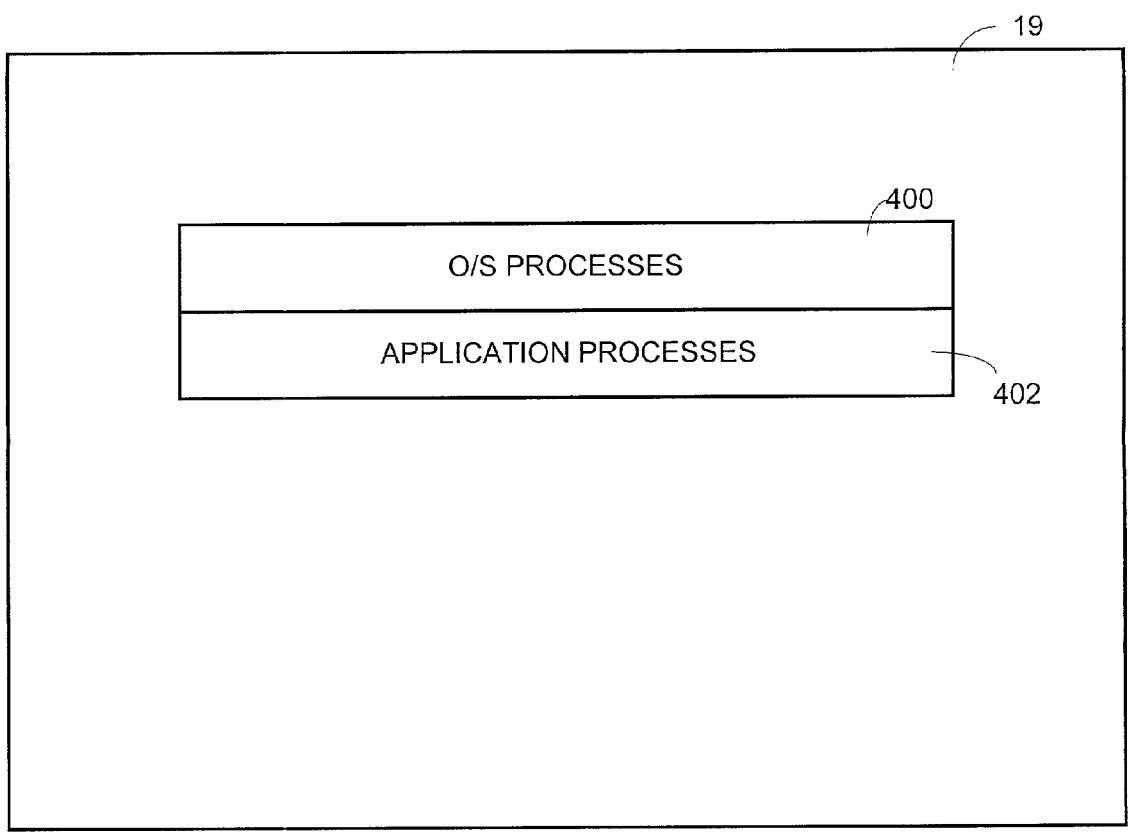
FIG. 5 is a diagram illustrating program processes that may reside in a system memory in a target server in the network of FIG. 1.
Figure 6:
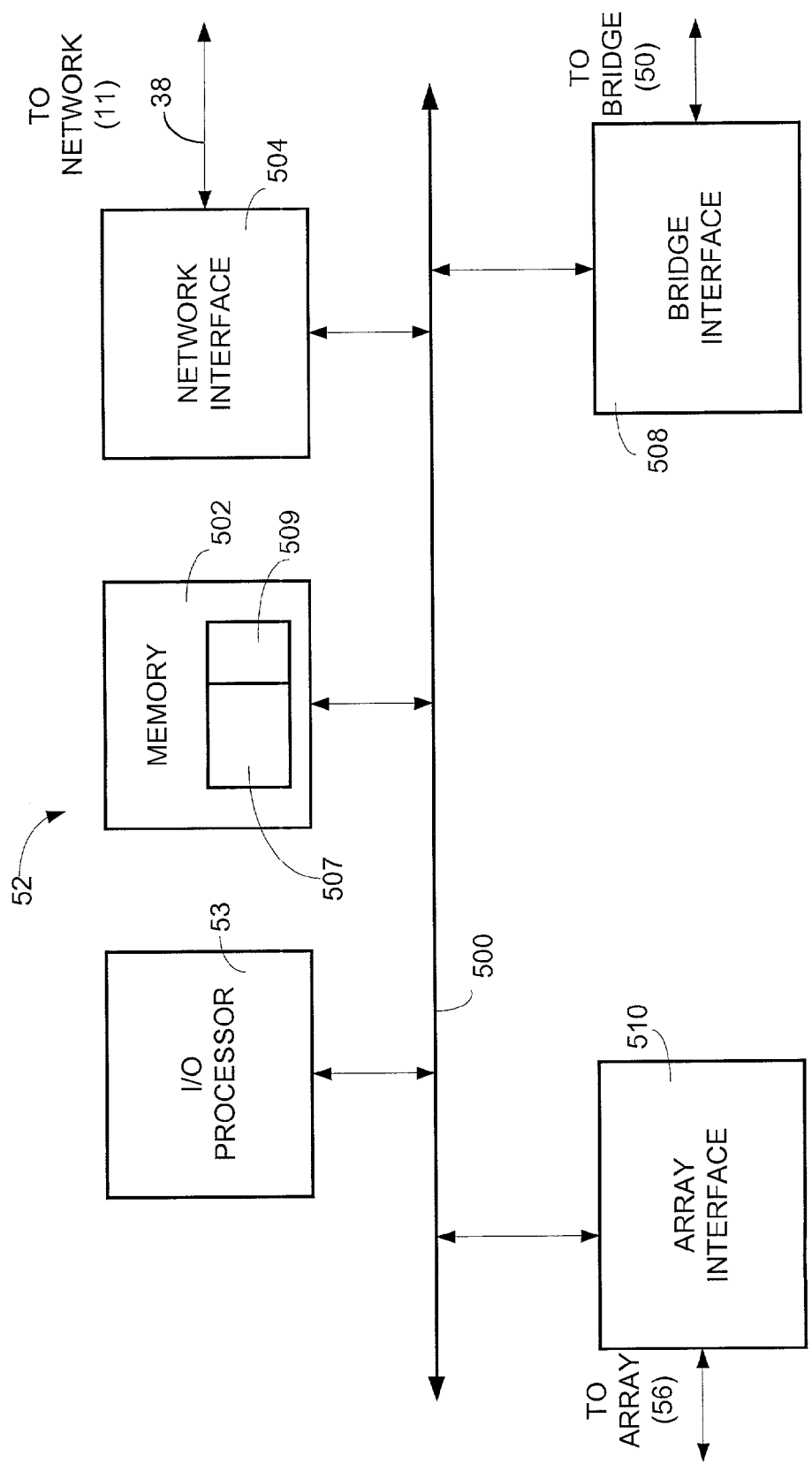
FIG. 6 is a diagram illustrating components of an HBA comprised in a target server in the network of FIG. 1.

Among the processes 19 that may reside in the system memory 18 in the originating server 12 may be a plurality of operating system program processes 400 and a plurality of application-level program processes 402 (see FIG. 5). Among the processes 45 that may reside in the system memory 44 in the target server 14 may be a respective plurality of operating system program processes 300 (see FIG. 4).

Figure 7:
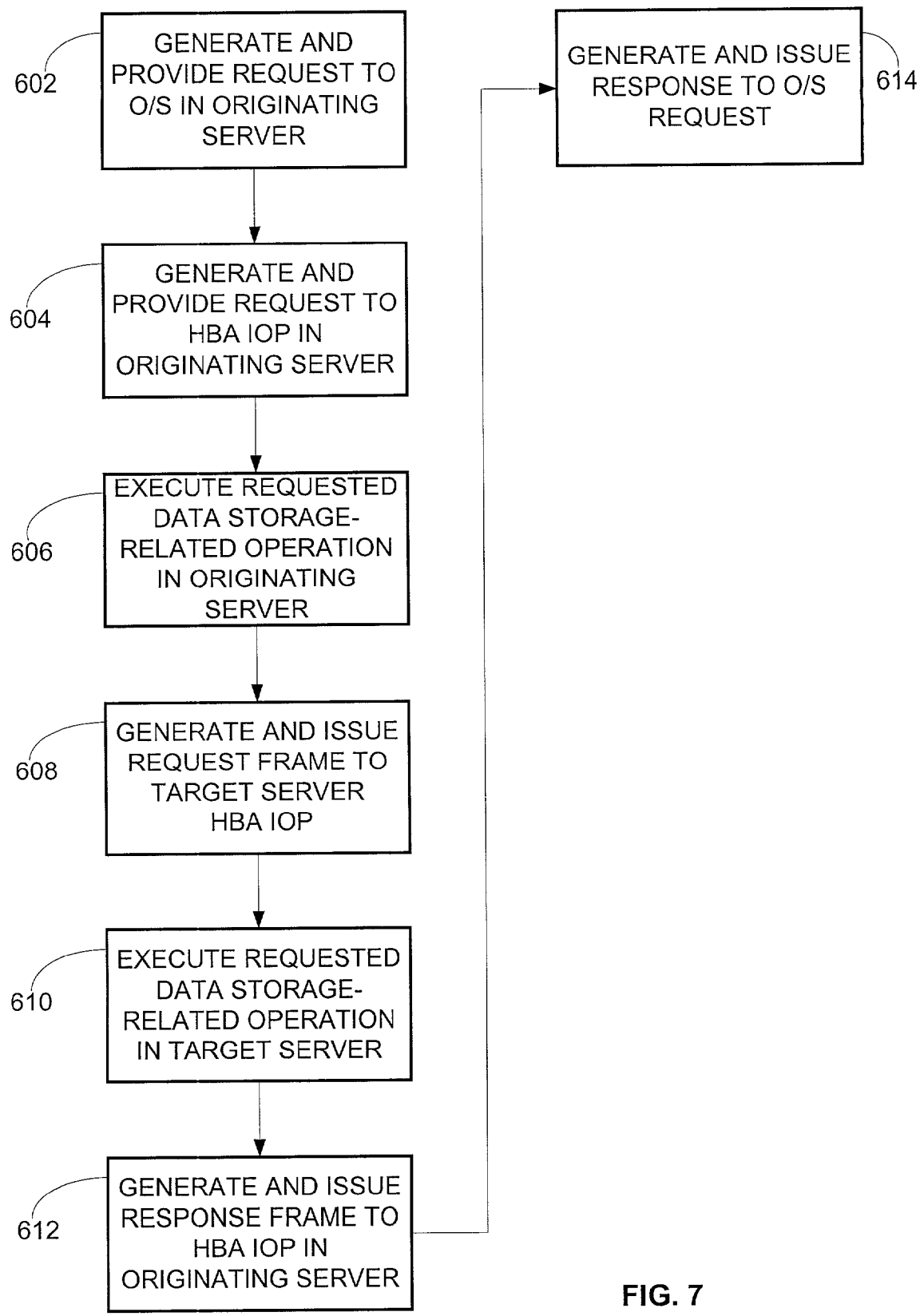
FIG. 7 is a flowchart illustrating operations that may be performed in the network of FIG. 1.
Figure 8:
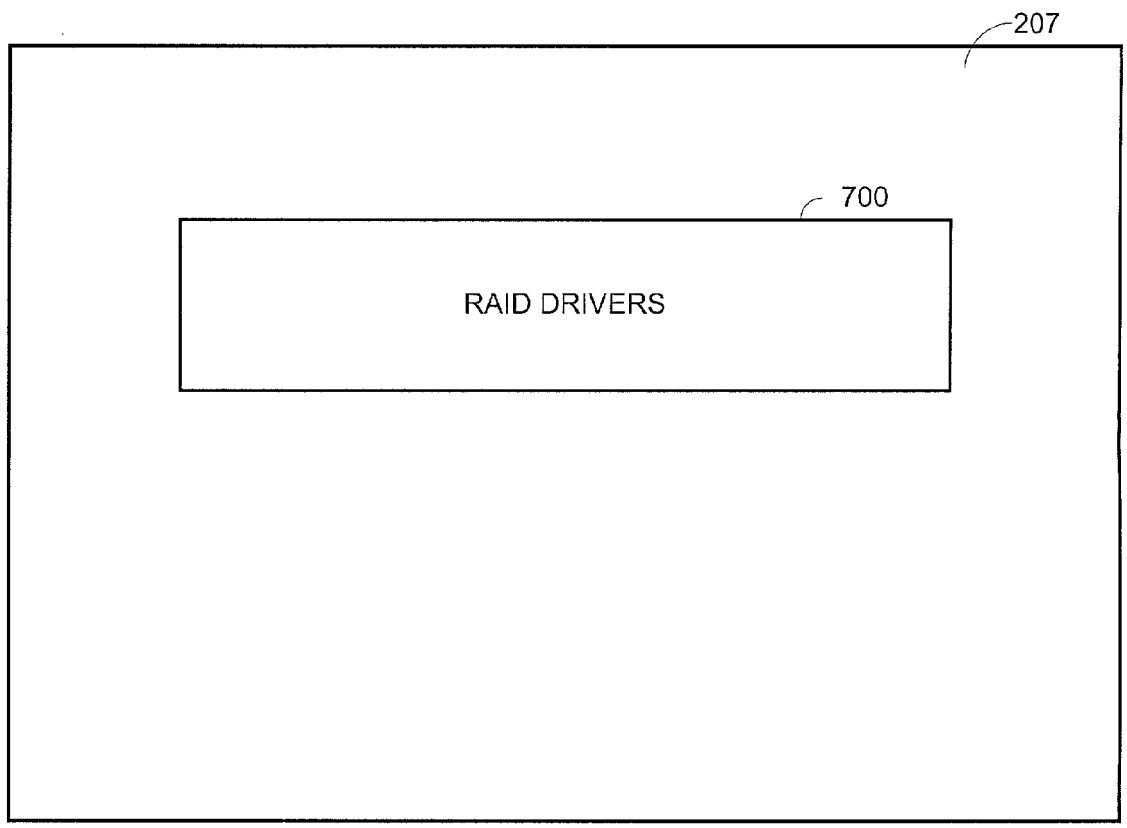
FIG. 8 is a diagram illustrating program processes that may reside in memory in the HBA of FIG. 3.
Figure 9:
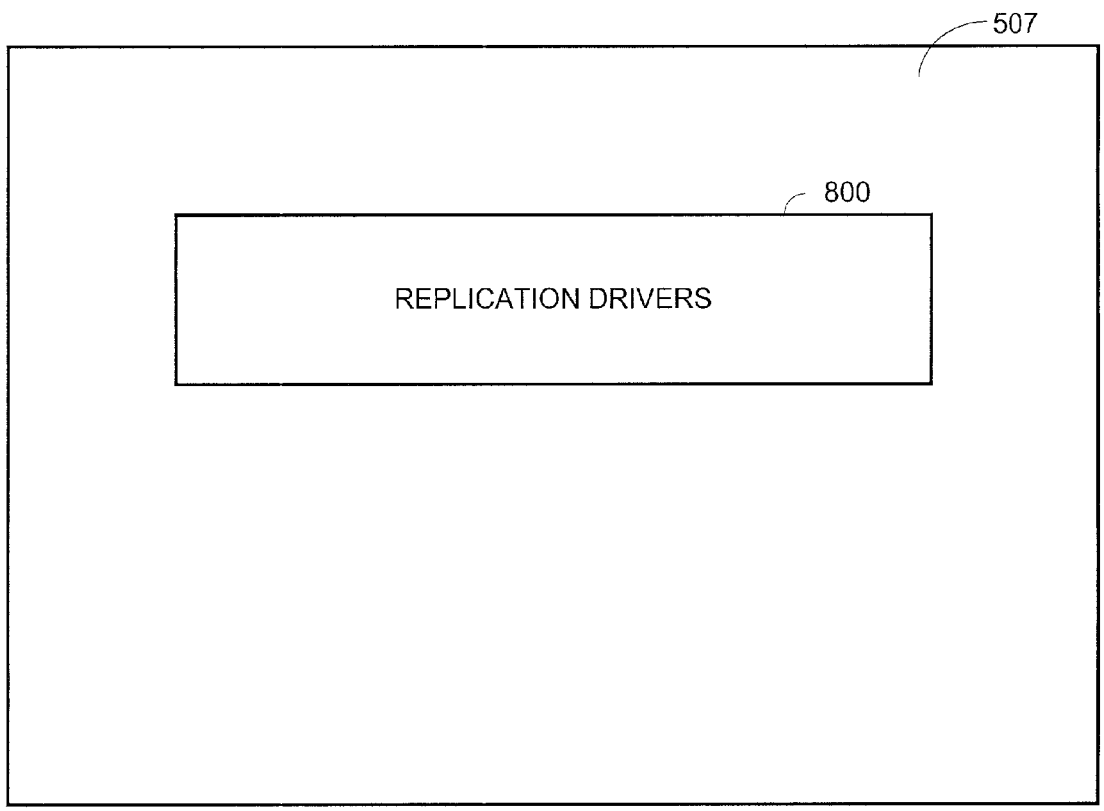
FIG. 9 is a diagram illustrating program processes that may reside in memory in the HBA of FIG. 6.

Referring particularly to FIGS. 1, 5, and 7, using the interface 20, the human user of the server 12 may issue a data storage-related operation request/command to a program process (e.g., a relational database process) comprised in application-level program processes 402. This command may request, e.g., the establishment of a replicated/mirrored data volume pair relationship between a data volume (e.g., primary data volume 33) in a primary array (e.g., array 32) in the originating server 12 and a data volume (e.g., redundant data volume 57) in an associated redundant array (e.g., array 56) in the target server 14, respectively, the severing of such a relationship, the re-establishment of such a relationship after such severing has occurred, the changing (e.g., expansion or contraction) of the size of the data volumes 33 and 57 involved in such a relationship, or the storing of user data (e.g., user data 404), after the user data 404 has been stored in system memory 18, into the primary data volume 33 in a primary array 32, and the replication of that data 404 in the redundant volume 57 in the redundant array 56 user data 404. The user data 404 may be generated as a result of the operations of one or more of the application-level program processes 402, or may be generated by and forwarded to the server 12 from a client node (not shown) in the network 10 (e.g., via a not shown NIC comprised in the server 12). Each of the volumes 33 and 57 may have an identical respective size (i.e., in terms of data storage space) and may be a respective logical data volume that may span more than one respective physical disk mass storage device and/or may consume less than the entire data storage space comprised in a single respective physical disk mass storage device.

In response to the data storage-related operation request/command issued by the human user of server 12, the program process to which the request/command was issued may cause the CPU 16 to generate and provide to one of the O/S processes 400 in memory 18, via the system 22, a data storage-related operation request that corresponds to the request/command issued by the user of server 12 (i.e., that requests the execution of the same data storage-related operation requested by the human user; see operation 602 in FIG. 7). In response to the request generated in operation 602, the O/S process receiving the request generated in operation 602 may cause the CPU 16 to generate and provide to the processor 27 in HBA 28, via the systems 22, 24, and 200, a data storage-related operation request 60 that corresponds to the request/command issued by the user (see operation 604 in FIG. 7). Alternatively, a background process (not shown) comprised in the processes 19 may cause the CPU 16 to generate and provide to the processor 27 the request 60. In either case, as part of the operation 604, if the request/command issued by the user requested the storage of data 404 in the volumes 33 and 57, the CPU 16 may also retrieve and forward the data 404 from the memory 18 to the processor 27 via the systems 22, 24, and 200, and the request 60 may contain or reference the data 404 forwarded to the processor 27; the processor 27 may cause the forwarded data 404 to be initially stored in the memory 202.

In response to the request 60, the processor 27 may cause the execution of the data storage-related operation requested in the request 60 (see operation 606 in FIG. 7). That is, the execution of the data storage-related operation requested in the request 60 may require the execution of respective sets data storage-related operations in the originating server 12 and in the target server 14; additionally, among the processes 207 that may reside in the memory 202 in HBA 28 may be redundant array of independent disks (RAID) driver processes 700. In response to the receipt of the request 60 by the processor 27, the driver processes 700 may cause the processor 27 to execute in the originating server 12, and to initiate the execution in the target server 14 of respective sets of data storage-related operations that must be executed in the originating server 12 and in the target server 14 to carry out the data storage-related operation requested in the request 60.

Depending upon the type of data storage-related operation requested in the request 60, in order to cause the execution in the originating server 12 of the respective set of data storage-related operations that must be executed therein to carry out the data storage-related operation requested in the request 60, the processor 27 may update/modify one or more entries in data storage management/configuration tables 209 and/or provide one or more commands (collectively or singly referred to by the structure in FIG. 1 referenced by numeral 64) to the primary array 32. That is, the processor 27 may maintain in the memory 202 the tables 209, and the information contained in the tables 209 may map the physical characteristics/configurations of the individual disk mass storage devices in the arrays 32 and 56 to the logical characteristics/configurations/relationships that are desired for and/or have been imposed upon such devices. For example, the information in the tables 209 may correlate regions in the physical mass storage devices in the arrays 32 and 33 to logical data volumes, the types of data encoding/formatting used in the physical and logical volumes, respective sizes (in terms of data storage space) of the logical and physical volumes/devices in the arrays 32 and 56, respective associations that have been established between respective primary data volumes in array 32 and redundant data volumes in array 56 (i.e., which primary data volumes in array 32 are mirrored by which redundant data volumes in array 56, the association of the arrays 32 and 56 as a primary array-redundant array pair, etc). If the request 60 requests the execution of a data storage-related operation that does not involve the storing of user data (e.g., user data 404) in the arrays 32 and 56 (e.g., if the request 60 requests the establishment of a replicated/mirrored data volume pair relationship between data volume 33 and data volume 57, the severing of such a relationship, the re-establishment of such a relationship after such severing has occurred, or the changing (e.g., expansion or contraction) of the size of the data volumes 33 and 57 involved in such a relationship), then the processes 700 may cause the processor 27 to verify that the operation requested in the request 60 is possible/permitted given the physical and/or pre-established logical characteristics/relationships indicated in the tables 209; if the requested operation is possible/permitted, the processes 700 may cause the processor 27 to update/modify one or more appropriate entries in the tables 209 so as to cause the tables 209 to indicate reflect the change in logical characteristics/relationships requested by the request 60. Conversely, if the requested operation not possible/permitted, the processes 700 may cause the processor 27 both to issue to the CPU 16 via the system 24 and 24 an error message indicating same and to terminate the data storage-related operation. Also conversely, if the request 60 requests the storage of user data (e.g., user data 404) in the arrays 32 and 56 (e.g., in the logical volumes 33 and 57), the processes 700 may cause the processor 27 to generate and provide one or more commands (collectively or singly referred to by the structure referenced in FIG. 1 by the numeral 64) to the array 32 (via the bus 200 and the interface 210) to cause the user data 404 to be written into the appropriate physical location or locations in the disk mass storage devices in the array 32 that comprise the logical data volume 33.

In order to initiate the execution in the target server 14 of the respective set of data storage-related operations that must be executed therein in to carry out the data storage-related operation requested in the request 60, the processes 700 may cause the processor 27 to generate (using operations involving multiple transactions/data transfers between the processor 27 and the memory 202) and to forward to the processor 53 (via the bus 200, network interface 204, link 34, network 11, link 38, network interface 504, and bus 500) one or more data storage-related operation request frames (collectively or singly referred to in FIG. 1 by the structure referenced by numeral 62; see also operation 608 in FIG. 7). That is, the processes 700 may include network communication stack processes that may generate, via multiple operations/data transfers between the processor 27 and the memory 202, and if the data storage-related operation requested by the request 60 involves the storage of the data 404 in the arrays 32 and 56, then the processes 700 may cause the processor 27 to fragment the data 404 into a sequence of one or more data payloads suitable for encapsulation in a respective sequence of one or more frames 62, and may cause the processor 27 to generate and transmit the sequence of frames 62 to the processor 53 in HBA 52. Conversely, if the data storage-related operation requested by the request 60 does not involve storage of data 404 in the arrays 32 and 56, then only a single frame 62 may need to be generated and transmitted from the HBA 28 to the HBA 56. Each of the frames 62 transmitted from the HBA 28 to the HBA 52 may have the data structure 100 shown in FIG. 2.

The respective data structure 100 of each frame 62 may include respective fields 102, 104, 106, 108, 110, 112, 114, and 116; each of these respective fields 102, 104, 106, 108, 110, 112, 114, and 116 may contain one or more respective data values. Field 102 is a respective Ethernet frame header field, and field 104 is a respective Ethernet frame footer field. Each of these fields 102 and 104 may contain additional respective fields (e.g., respective Ethernet and IP source and designation address fields, Ethernet and IP checksum fields, etc.) that may be used to encapsulate the remaining fields 106, 108, 110, 112, 114, and 116 in the respective frame structure 100 as a respective TCP/IP packet-containing Ethernet frame. The respective values that may be contained in the respective fields comprised in the header field 102 and footer field 104 may be selected to permit the HBA (e.g., HBA 28) generating the respective frame structure 100 to be able to validly transmit the respective frame structure 100 to the HBA (e.g., HBA 52) intended to receive the respective frame structure 100 via the network 11. Encapsulated by the respective frame header 102 and frame footer 104 may be a respective target node iSCSI protocol address field 106, a respective initiating node iSCSI protocol address field 108, a respective data storage-related operation command/message field 110, a respective data payload field 112, a respective message identification field 114, and a respective checksum field 116. The respective command/message field 110 in each respective frame 62 may contain a value that identifies the type of data storage-related operation commanded by the request 60, and may specify (e.g., in additional sub-fields in the field 110) values that may identify additional parameters that may be used in implementation of the command operation (e.g., particular primary and redundant volumes involved, sizes of such volumes, respective address in the target logical volume 57 at which to start writing data into the target logical volume 57, the number of bytes of data payload present in the field 112, etc.); the respective fields 106 and 108 in each respective frame 62 may contain respective sets of values that contain target and initiating node addressing and naming information determined in accordance with a conventional iSCSI addressing scheme (e.g., in accordance with the addressing scheme disclosed in Satran, "iSCSI," Internet-Draft Specification, draft-ietf-ips-iscsi-05, IP Storage Working Group of the Internet Engineering Task Force, published Mar. 1, 2001 by the Internet Engineering Task Force, Internet Engineering Task Force Secretariat c/o Corporation for National Research Initiatives, 1895 Preston White Drive, Suite 100, Reston, Va. 20191, United States of America) that may map to/address the particular storage devices in the arrays 32 and 56, involved in the data storage-related operation. Of course, different addressing information (e.g., addressing information based upon different addressing schemes, such as other iSCSI addressing schemes in accordance with other/later-developed versions of the aforesaid "iSCSI" Internet-Draft Specification of the IP Storage Working Group of the Internet Engineering Task Force) may be contained in the fields 106 and 108 so long as the network 11 and the nodes 12 and 14 are suitably configured to route and process, respectively, frames 100 based upon such different addressing information. If the data storage-related operation commanded by the request 60 involves the storage of data 404 into the arrays 32 and 56, then payload field 112 may contain a respective data payload from the sequence of data payloads generated by the processor 27 from the data 404 in the manner described above, and a respective TCP sequence number contained in the header 102 may indicate the sequence order of that data payload fragment in the sequence of data payload fragments generated by the processor 27. The message ID field 114 may contain a frame sequence number that may identify the particular frame 62 that contains that frame sequence number. The checksum field 116 may contain a checksum value representing the checksum of a data value formed by the concatenation of the values contained in the fields 106, 108, 110, 112, 114, and 116. Alternatively, depending upon the particular protocol or protocols used to forward and/or route the frame 100 in and through the network 11, and also depending upon the particular processing that the frame 100 may undergo in the nodes 12 and 14, the frame 100 may contain fields and/or information other than or in addition to those contained in the fields shown in FIG. 2, in order to facilitate such forwarding, routing, and processing, without departing from this embodiment of the present invention.

Among the processes 507 that may reside in the memory 502 may be replication driver processes 800. These processes 800 may include network communication stack processes. When a frame 62 is received by the processor 53, the processes 800 may cause the processor 53 to initially store the received frame 62 in the memory 502, and thereafter, to de-encapsulate and parse the frame 62, verify (i.e., through verification of checksums contained in the frame 62) that no errors occurred during transmission of the frame 62 to the processor 53, and determine, among other things, the particular respective values that may be contained in the respective fields 102, 104, 106, 108, 110, 112, 114, 116 and the respective sub-fields contained in these respective fields in the frame 62. Based upon the values contained in these respective fields and respective sub-fields, the processor 53 may determine and perform in the server 14 the particular data storage-related operation requested in the received frames 62 (see operation 610 in FIG. 7). More specifically, depending upon the type of data storage-related operation commanded in a received frame 62, in order to cause the execution in the server 14 of the respective data storage-related operation requested in the frame 62, the processor 53 may update/modify one or more entries in data storage management/configuration tables 509 and/or provide one or more commands (collectively or singly referred to by the structure in FIG. 1 referenced by numeral 70) to the redundant array 56. That is, the processor 53 may maintain in the memory 502 the tables 509 and the information contained in the tables 509 may be similar in content to the information comprised in the tables 209 that are maintained in the memory 202 by the processor 27. If the data storage-related operation commanded in the received frame 62 requests the execution of a data storage-related operation that does not involve the storing of user data (e.g., user data 404) in the array 56 (e.g., if the request 60 requested the establishment of a replicated/mirrored data volume pair relationship between data volume 33 and data volume 57, the severing of such a relationship, the re-establishment of such a relationship after such severing has occurred, or the changing (e.g., expansion or contraction) of the size of the data volumes 33 and 57 involved in such a relationship), then the processes 800 may cause the processor 53 to verify that the operation commanded in the frame 62 (i.e., the command indicated in the field 110 in the received frame 62) is possible/permitted given the physical and/or pre-established logical characteristics/relationships indicated in the tables 509; if the commanded operation is possible/permitted, the processes 800 may cause the processor 53 to update/modify one or more appropriate entries in the tables 509 so as to cause the tables 509 to indicate/reflect the change in logical characteristics/relationships commanded in the frame 62. Conversely, if the frame 62 requests the storage of user data (e.g., user data 404) in the array 56 (i.e., in the volume 57 in array 56), the processes 800 may cause the processor 53 to determine (i.e., from the respective TCP information contained in the frame 62) whether any other frames 62 may contain additional fragments of the user data 404. If the processor 53 determines that no other frames 62 may contain such additional fragments of the user data 404, the processes 800 may cause the processor 53 to generate and provide one or more commands (collectively or singly referred to by the structure referenced in FIG. 1 by the numeral 70) to the array 56 (via the bus 500 and the interface 510) to cause the user data 404 to be written into the appropriate physical location or locations in the disk mass storage devices in the array 56 that comprise the logical data volume 57. However, if the processor 53 determines that there are other frames 62 that may contain additional fragments of the user data 404, the processes 800 may cause the processor 53 to store the respective data payloads from such other frames 62 in the memory 502, and to reconstruct and store in the memory 502, based upon the respective TCP sequence information and/or message identification values contained in the received frames 62, the user data 404. Thereafter, the processes 800 may cause the processor 53 to fragment the reconstructed user data 404 into one or more data blocks, and to generate and provide one or more commands 70 to the array 56 (via the bus 500 and the interface 510) to cause the blocks of reconstructed user data to be written into the appropriate physical location or locations (e.g., sectors, blocks, etc.) in the disk mass storage devices in the array 56 that comprise the logical data volume 57.

After each respective frame 62 has been properly received by the processor 53 (i.e., without any transmission error), the processes 800 may cause the processor 53 to generate and provide to the processor 27 a respective acknowledgement or reply Ethernet frame (collectively or singly referred to in FIG. 1 by the structure referenced by numeral 66; see also operation 612 in FIG. 7). Each reply frame 66 may have a respective structure that may be identical to the structure 100 shown in FIG. 2, except that in the respective reply frame 66, the respective command/message field 110 may contain a respective value that may indicate that a frame 62 that comprised the message identification number specified in the field 116 in the respective reply frame 66 has been received and processed by the processor 53. That is, for each respective frame 62 properly received and processed by the processor 53, the processes 800 may cause the processor 53 to generate and issue to the processor 27 (via the bus 500, interface 504, link 38, network 11, link 34, interface 204, and bus 200) a respective reply frame 66 that references (i.e., contains in the message identification field 114 of the reply frame 66) the respective message identification number that was contained in the respective frame 62. In the tables 209, the processor 27 may correlate the respective message identification numbers contained in respective frames 62 with the respective message identification numbers contained in respective received reply frames 66 to determine which of the message frames 62 forwarded by the processor 27 to the processor 53 have been received and processed (e.g., in order to determine, using conventional techniques, whether a respective message frame 62 may have been lost in transit through the network 11, and whether to resend that respective message frame 62 to the processor 53). After the processor 27 has received all of the frames 66 generated by the processor 27 in response to a given data storage-related operation request 60 from the CPU 16, the processes 700 may cause the processor 27 to determine (assuming that the processor 27 also was able to successfully complete the operations that the processor 27 executed in response to the request 60) that the data storage-related operation requested by the request 60 has been successfully completed in the network 10, and may cause the processor 27 to forward to the CPU 16, via the systems 24 and 22, a message 72 to indicate to the O/S processes 400, the successful completion of the operation requested by the request 60 (see operation 614 in FIG. 7). In response to the message 72, the O/S processes 400 may cause the CPU 16 to provide to the application processes 402 in the memory 18 an indication of such successful completion; in response thereto, the processes 402 may cause the CPU 16 to indicate such successful completion to the human user of the server 12 via the interface 20.

In the event that the processor 53 determines (e.g., from the tables 509) or otherwise (e.g., in the event of a checksum validation error when processing a request frame 62), that it is unable to perform a data storage-related operation requested in a frame 62 (e.g., as a result of a detected failure in the HBA 56 or a disk drive/cables in the array 56, a mis-match in the sizes of the volumes 33 and 57, lack of sufficient storage space in the volume 57, errors in addressing in the request frame 62, etc.), the processes 800 may cause the processor 53 to generate and forward to the processor 27 a reply frame 66 having a respective value in the command message field 110 that indicates that an error in performing the requested operation has occurred, as well as, the type and nature of the error. In response to this message 66, the processes 700 may cause the processor 27 to generate and issue to the CPU 16 an error message (of the type described above), and an error acknowledgement frame (not shown) to the processor 53 that is identical to that of a respective reply frame 66, except that in the error acknowledgement frame, the respective command/message field 110 may indicate receipt and processing by the processor 27 of the message 66.

If, after a predetermined time period, the processor 27 fails to receive a valid acknowledgment/reply/error frame 66 in response to a request frame 62, the processes 700 may cause the processor 27 to re-generate and re-send a copy of that request frame 62 to the processor 53, and to again wait the predetermined time period to receive a valid reply frame 66 in reply thereto; if after a predetermined number of re-generations and re-transmissions of the request frame 62 the processor 27 still have not received a valid reply frame 66 thereto, or if the nature of the error reported in a received error frame 66 is of a predetermined type that cannot be corrected without human operator intervention, the processes 700 may cause this condition to be reported to the CPU 16, which may then report same to the human user of the server 12 via the interface 20. If the server 12 is appropriately configured for such operation, the CPU 16 may alternatively, or in addition thereto, generate and transmit an alert message (e.g., an email or pager message) to a human operation indicating such condition. The processes 700 may then consider that the association between the volumes 33 and 57 (i.e., as a primary volume and an associated target volume, respectively) has been terminated, and may cause the processor 27 to record changed tracks/sectors that may occur in the volume 33 for later use, in manner described below, in re-establishing the mirrored relationship between the volumes 33 and 57.

Although not specifically shown in the Figures, it is important note that the disk arrays 30 and 58 may be associated with each other as a redundant and a primary array, respectively, at least one respective data volume 31 in redundant array 59 may be a redundant data volume associated with at least one respective primary data volume 59 in the primary array 58, and HBA 26, array 30, link 36, network 11, link 40, HBA 54, array 58, systems 48 and 50, CPU 42, memory 44, and interface 46 may be configured to permit and facilitate the disk arrays 30 and 48 and the data volumes 31 and 30 to operate in such relationships in accordance with the teachings of this embodiment of the present invention that permit the primary and redundant arrays 32 and 56 and the primary and redundant data volumes 33 and 57 to operate in accordance with this embodiment of the present invention in the manner set forth above. Additionally, it should be understood that the servers 12 and 14 may include NIC devices (not shown) that may be coupled to one or more client computer nodes via the network 11 in such a way as to permit the client computer nodes to be able to access the user data stored in the primary arrays 32 and 58.

Additionally, in order to facilitate re-establishment of association between the primary and redundant volumes 33 and 57 (i.e., as a mirrored pair of data volumes) after a previous termination of such association, the tables 209 may contain listings of logical tracks/blocks in the volume 33 that have changed since the previous termination of such association. After the re-establishment of such association, the processes 700 may cause frames 62 to be transmitted from the processor 27 to the processor 53 that may cause corresponding logical tracks/blocks in the data volume 57 to be overwritten with the data presently stored in the tracks/blocks listed in the table 209 as having been changed after the termination of such association and prior to its re-establishment. During the time period after the termination and prior to the re-establishment of such association, the data volume 57 may be copied/backed-up (e.g., copied to tape or into another, not shown data volume).

Additional types of data storage-related operations also may be commanded by the frames 62. For example, when an appropriate predetermined value is inserted in the field 110 in a respective frame 62, the respective frame 62 may command an I/O processor (e.g., processor 53) receiving the frame 62 to generate and supply a respective reply frame 66 that may indicate/report to the I/O processor that transmitted the frame 62 all of the logical nodes, logical volumes, and target volumes associated with or controlled by the I/O processor receiving the frame 62, whether a given target volume that is associated with the I/O processor receiving the frame 62 is full or malfunctioning, whether on-going data replication operations involving such a target volume are progressing normally, or whether file systems in such a target volume are structured normally. Also, when an appropriate predetermined value is inserted in the field 110 in a respective frame 62, the respective frame 62 may command an I/O processor (e.g., processor 53) receiving the frame 62 to configure a standard frame size for the frame structure 100, or to update or configure management tables (e.g., tables 509) maintained by that I/O processor to reflect changes that may have occurred to the configuration of the array of disk mass storage devices associated with the HBA from which the frame 62 was transmitted, including, e.g., changes to the nature and characteristics of the physical and/or logical volumes comprised in such array.

If appropriately modified in ways apparent to those skilled in the art, various of the operations described herein as being carried out in this embodiment of the present invention by software processes may instead be implemented by hardware/circuitry, and vice versa. The software processes 19, 45, 207, and 507 needed to implement this embodiment of the present invention may be generated as a result of execution by processors 16, 42, 27, and 53, respectively, of respective sets of program instructions stored/encoded in computer-readable memories (e.g., read only memories comprised in memories 18, 44, 202, and 502, respectively, and/or not shown optical disk read only memory).

Thus, in summary, in accordance with one embodiment of the present invention, a network may be provided that may include first and second network nodes coupled together via a network communications link, and first and second sets of mass storage devices associated with the first and second network nodes, respectively. The first and second network nodes may comprise an originating server and a target server, respectively. The originating server and the target server may comprise first and second input/output (I/O) processors, respectively. The first I/O processor may cause, in response to a first request, both the execution of a first data storage-related operation associated with the first set of mass storage devices and the issuance of a second request from the originating server to the target server via the link to cause the second I/O processor to perform, in response to the second request, a second data storage-related operation associated with the second set of mass storage devices.

Advantageously, in this embodiment of the present invention, the vast majority of operations that are performed in the originating and target servers to carry out data storage-related operations may be offloaded from the respective CPUs, system memories, and system buses in these servers to HBA I/O processors, internal HBA memories, etc. This permits the number of CPU, system memory, and system bus transactions and operations that are performed in the originating and target servers to carry out data storage-related operations in this embodiment of the present invention to be substantially reduced compared to the prior art. Advantageously, this prevents excessive amounts of originating and target server CPU, system memory, and system bus processing resources to be consumed when carrying out such operations, and frees such resources for use in other processing activities, and increases the speed and reliability with which such operations may be carried out in this embodiment of the present invention, compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A first adapter to use in a first server in a network, the first adapter comprising:
   circuitry to cause, in response to a first request received by the first adapter, execution of a first data storage-related operation associated with a first set of mass storage devices and to issue, also in response to the first request, a second request from the first adapter to a second adapter in a second server in the network to cause the second adapter to perform, in response to the second request, a second data storage-related operation associated with a second set of mass storage device;
   additional circuitry to issue, in response to a first message from the second adapter, a second message to a process in the first server, the first message indicating that the second data storage-related operation has been completed, the second message indicating that a respective data storage-related operation requested by the first request has been completed,
   wherein the second request and the first message each include a respective message identification field, and respective message identification fields in the second request and the first message contain identical message identification values.

2. The first adapter of claim 1, wherein the circuitry and the second adapter each comprise a respective I/O processor.

3. The first adapter of claim 1, wherein:
   the first adapter comprises a first host bus adapter coupled to the first set of mass storage devices;
   the second adapter comprises a second host bus adapter coupled to the second set of mass storage devices; and
   the first adapter and the second adapter are coupled together via a network communication link.

4. A first adapter to use in a first server, the first adapter comprising:
   circuitry to perform, in response to a request, a data storage-related operation associated wit a first set of mass storage devices, the request being issued from a second adapter in a second server in response to another request received by the second adapter to cause the second adapter to perform, in response to the another request, another data storage-related operation associate with a second set of mass storage devices;
   additional circuitry to issue a first message to the second adapter to indicate that the data storage-related operation associated with the first set of mass storage devices has been completed, and the second adapter is configured to issue, in response to the first message, a second message to a process in the second server;
   wherein the second request and the first message each include a respective message identification field, and respective message identification fields in the second request and the first message contain identical message identification values.

5. The first adapter of claim 4, wherein:
the first adapter comprises a first host bus adapter coupled to the first set of mass storage devices;
the second adapter comprises a second host bus adapter coupled to the second set of mass storage devices; and
the first adapter and the second adapter are coupled together via a network communication link.

6. A method of using a first adapter in a first server in a network, the method comprising: using the first adapter to perform, in response to a first request, a first data storage-related operation associated with a first set of storage devices;
issuing from the first adapter, also in response to the first request, a second request to a second adapter in a second server in the network to cause the second I/O adapter to perform, in response to the second request, a second data storage-related operation associated with a second set of mass storage devices;
issuing from the first adapter, in response to a first message from the second adapter, a second message to a process in the first server, the first message indicating that the second data storage-related operation has been completed, the second message indicating that a respective data storage-related operation requested by the first request has been completed;
wherein the second request and the first message each include a respective message identification field, and respective message identification fields in the second request and the first message contain identical message identification values.

7. The method of claim 6, wherein the first adapter and the second adapter each comprise a respective I/O processor.

8. Computer program instructions residing in a computer-readable memory, the computer program instructions comprising a set of instructions that when executed by a first processor of a first adapter in a first server cause the processor to perform operations comprising:
executing in response to a first request, a first data storage-related operation associated with a first set of mass storage devices;
generating of, also in response to the first request, a second request that may be issued from the first adapter to a second processor in second adapter to cause the second processor to perform, in response to the second request, a second data storage-related operation associated with a second set of mass storage devices;
issuing from the first adapter, in response to a first message from the second adapter, a second message to a process in the first server, the first message indicating that the second data storage-related operation has been completed, the second message indicating that a respective data storage-related operation requested by the first request has been completed;
wherein the second request and the first message each include a respective message identification field, and respective message identification fields in the second request and the first message contain identical message identification values.

9. The computer program instructions of claim 8, wherein:
the second data storage-related operation comprises one or more of the following operations:
designation of a first data volume in the second server in which data stored in a second data volume in the first server is to be replicated;
expansion of a size of the volume; and
replication in the first data volume of the data.

10. The computer program instructions of claim 8, wherein:
the second data storage-related operation comprises one or more of the following operations:
termination of a previously-established association between a first data volume in the second server and a second data volume in the first server, the association designating that data stored in the second data volume is to be replicated in the first data volume; and
re-establishment of the previously-established association after the previously established association has been terminated.

* * * * *